(12) United States Patent
Fujii et al.

(10) Patent No.: US 6,311,934 B1
(45) Date of Patent: Nov. 6, 2001

(54) WIRE HARNESS FIXING DEVICE

(75) Inventors: Koichi Fujii; Tatsuo Ogawa, both of Shizuoka; Masahiko Mizuno, Tokyo, all of (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/046,581

(22) Filed: Mar. 24, 1998

(30) Foreign Application Priority Data

Mar. 26, 1997 (JP) .................................................. 9-073847

(51) Int. Cl.$^7$ ........................................................ F16L 3/00
(52) U.S. Cl. ............................ 248/73; 248/71; 248/74.1; 411/508
(58) Field of Search ............................ 248/73, 71, 74.1, 248/74.3, 56; 411/508, 509, 510, 913

(56) References Cited

U.S. PATENT DOCUMENTS

| | | | |
|---|---|---|---|
| 3,894,706 | * | 7/1975 | Mizusawa ............................. 248/68 |
| 4,358,081 | * | 11/1982 | Notoya ................................... 248/73 |
| 4,457,482 | * | 7/1984 | Kitagawa .............................. 248/74.3 |
| 4,811,922 | * | 3/1989 | Yoneyama ............................. 248/71 |
| 4,918,261 | * | 4/1990 | Takahashi et al. ................... 174/135 |
| 4,936,530 | * | 6/1990 | Wollar .................................... 248/71 |
| 5,106,040 | * | 4/1992 | Cafmeyer et al. ...................... 248/73 |

FOREIGN PATENT DOCUMENTS

| | | |
|---|---|---|
| 53-86397 | 7/1978 | (JP) . |
| 5-8162 | 2/1993 | (JP) . |
| 5-19770 | 3/1993 | (JP) . |
| 6-35764 | 5/1994 | (JP) . |

* cited by examiner

Primary Examiner—Ramon O. Ramirez
Assistant Examiner—Kimberly Wood
(74) Attorney, Agent, or Firm—Armstrong, Westerman, Hattori, McLeland & Naughton, LLP

(57) ABSTRACT

A wire harness fixing device is provided which never wobbles or rotates regardless of the thickness of a body panel to which the fixing device is attached. Such wire harness fixing device includes an attachment plate, clips to be inserted through insertion holes of the body panel, and a pair of protrusions facing each other. The clips are situated between the pair of protrusions. The pair of protrusions are provided with seating portions onto which both side edges of the body panel are seated. The seating portions are taller at positions farther away from the clips.

7 Claims, 5 Drawing Sheets

F I G. 1
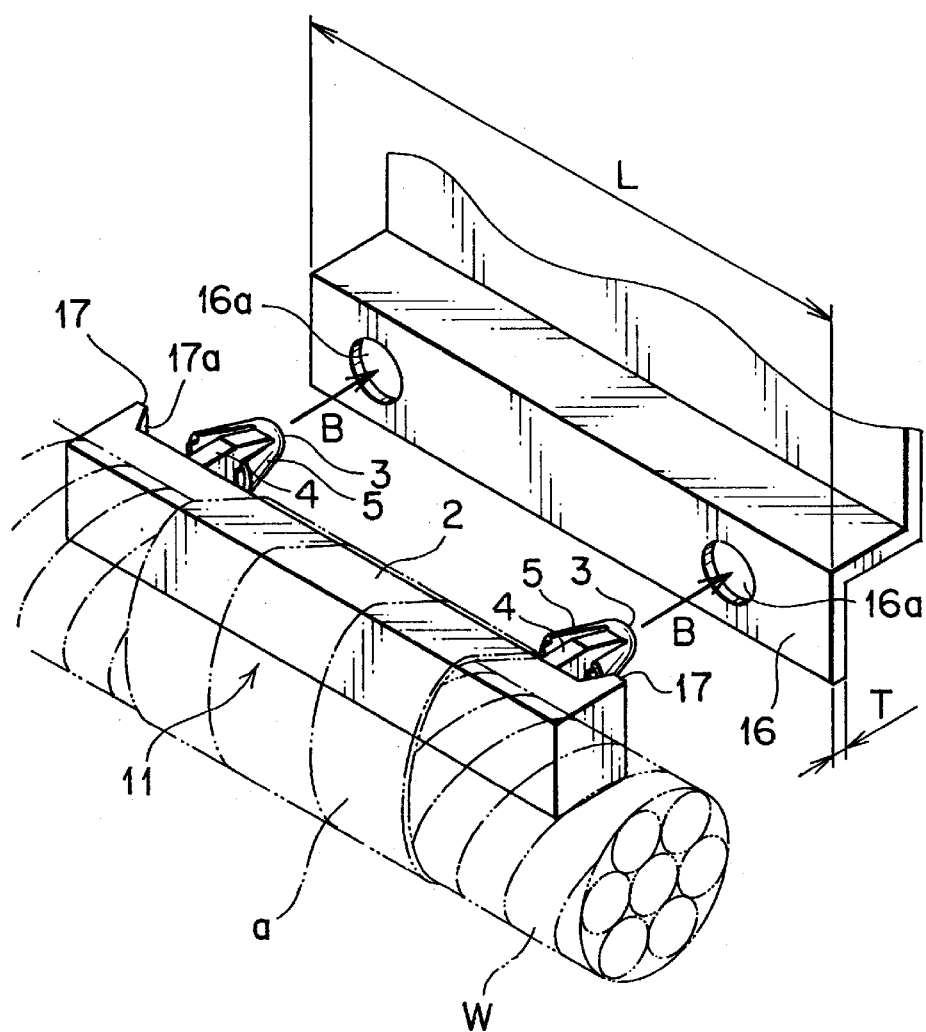

WIRE HARNESS FIXING DEVICE

BACKGROUND OF THE INVENTION

1. Field of the Invention

The present invention relates to a fixing device for attaching a wire harness to a vehicle body or a body panel.

2. Related Art

As shown in FIG. 5, there have been fixing devices of this kind. A fixing device 1 comprises an attachment plate 2, a clip 3 standing in the middle of the attachment plate 2, and a pair of stopper protrusions 7 at both ends of the attachment plate 2. A wire harness W is secured to the attachment plate 2 with tape a.

The clip 3 is made up of a supporting pillar 4 and a pair of stopper wings 5. Engaging protrusions 5b to be engaged with a stopper hole 6a of a body panel 6 are provided at the bottom of the stopper wings 5. When the stopper wings 5 are inserted into the stopper hole 6a of the body panel 6 in the direction indicated by arrow A, the engaging protrusions 5b are engaged with the stopper hole 6a so as to prevent the stopper wings 5 from radially expanding, and edge portions 5a of the stopper wings 5 are engaged with the rim of the engaging hole 6a so that the stopper wings 5 can be secured to the body panel 6.

The stopper protrusions 7 have such a height that the upper ends are in contact with the body panel 6, and stand at both ends of the attachment plate 2.

Thus, the clip 3 is inserted into the stopper hole 6a of the body panel 6 so as to support and secure the wire harness W, and the stopper protrusions 7 are brought into contact with the body panel 6 so as to securely hold the fixing device In recent years, car manufacturers have tried to reduce production costs by reducing the number of components employed in manufacturing a vehicle. For instance, some car components are employed for several purposes.

However, there are some problems with such fixing devices of the prior art. If a wire harness fixing device is produced such that it can be attached to a thin body panel, the stopper protrusions come into contact with thicker portions of the body panel before the stopper wings are engaged with the rim of the stopper hole of the body panel, thereby hindering attachment of the fixing device.

On the other hand, as shown in FIG. 6A, a fixing device 1' is produced such that the stopper wings 5 are engaged with the rim of a stopper hole 6a' of a thick body panel 6A, and that the stopper protrusions 7 are in contact with the body panel 6A. If such fixing device 1' is attached to a thin body panel 6B, as shown in FIG. 6B, there will be a gap h between the body panel 6B and the stopper protrusions 7, causing the fixing device 1' to wobble or rotate around the clip 3.

SUMMARY OF THE INVENTION

The principal object of the present invention is to provide a wire harness fixing device which never wobbles or rotates regardless of the thickness of a body panel to which the fixing device is attached.

To achieve the above object, the present invention provides a wire harness fixing device which includes: an attachment plate to which a wire harness is secured by wrapping tape therearound; clips to be inserted into holes formed through a body panel; a pair of protrusions facing each other between which the clips are situated; and seating portions provided on the pair of protrusions. The edges of the body panel are seated onto the seating portions, which are taller at positions farther away from the clips.

In the above structure, the pair of protrusions facing each other on the attachment plate are provided with the seating portions, and the seating portions are made taller at positions farther from the clips. Accordingly, the distance between the seating portions is greater at a position closer to the top of the stopper protrusions. Meanwhile, the thickness of the body panel becomes smaller as the distance between the seating portions becomes greater. Since the thickness of the body panel can be changed depending on the distance between the edges of the body panel seated onto the seating portions, or the distance between the edges can be changed depending on the thickness, the fixing device will never wobble after being attached to the body panel. Moreover, the edges of the body panel are fastened between the seating portions, so as to prevent the fixing device from rotating around a clip.

The seating portions may be formed by a plurality of protrusions of different heights.

Since the seating portions are tapered and made up of a plurality of protrusions of different heights, they can be formed in accordance with the type of the body panel, to which the fixing device is to be attached, and protrusions provided outside the seated protrusion can prevent the fixing device from rotating. In such structure, the fixing device will never wobble or rotate around a clip.

The above and other objects and features of the present invention will be more apparent from the following description taken in conjunction with the accompanying drawings.

BRIEF DESCRIPTION OF THE DRAWINGS

FIG. 1 is a perspective view showing one embodiment of a wire harness fixing device in accordance the with the present invention.

DETAILED DESCRIPTION OF THE PREFERRED EMBODIMENTS

Figure 2A:
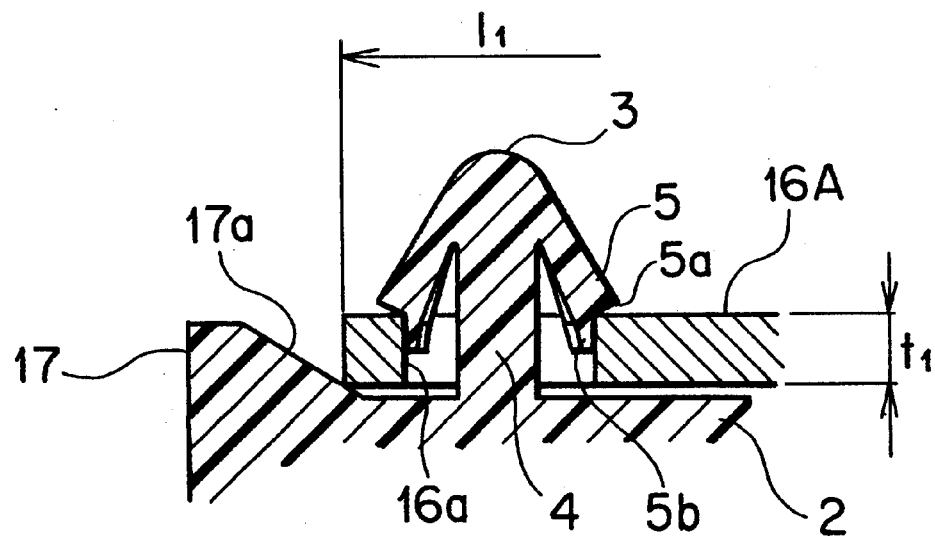
FIG. 2A is an enlarged sectional view showing how the wire harness fixing device shown in FIG. 1 is attached to a thick body panel.

The following is a description of one embodiment of the present invention, with reference to the accompanying drawings. It should be noted that the same components as in the prior art are indicated by the same reference numerals as well, and will not be described in detail.

In FIG. 1, a wire harness fixing device 11 (hereinafter referred to simply as "fixing device") has clips 3 standing in the vicinity of both edges of an attachment plate 2. A pair of stopper protrusions 17 are provided at both edges of the fixing device 11. Two stopper holes 16a are formed through a body panel 16, and the clips 3 are inserted into the stopper hole 16a in the direction indicated by arrows B.

Figure 2B:
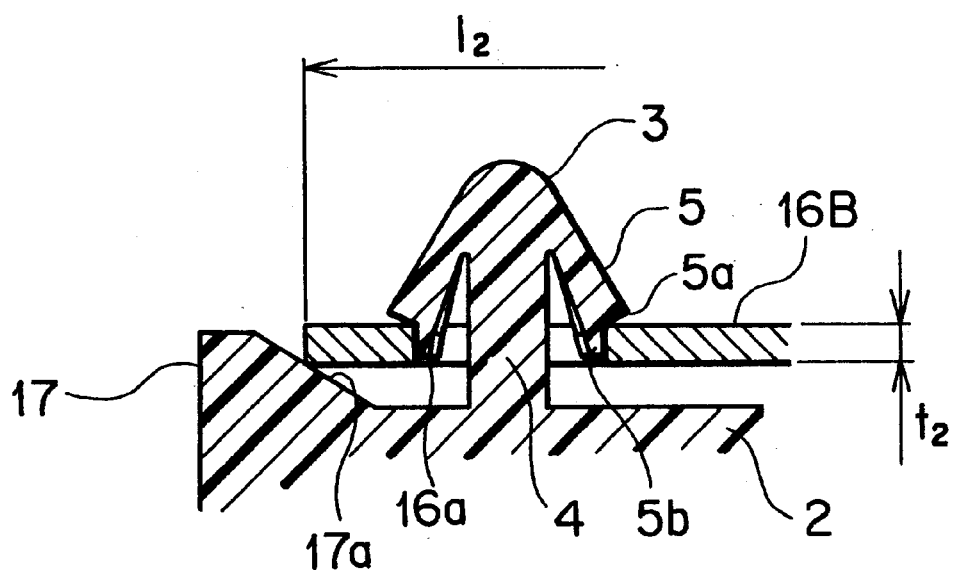
FIG. 2B is an enlarged sectional view illustrating the wire harness fixing device shown in FIG. 1 is attached to a thin body panel.

In FIGS. 2A and 2B, the stopper protrusions 17 have tapered seating portions 17a onto which the edges of the body panels 16A and 16B are seated, respectively. The stopper protrusions 17 are provided in the vicinity of both edges of the attachment plate 2.

The seating portions 17a are tapered from the clips 3 toward the edges of the attachment plate 2, that is, they are taller at a position farther from the clips 3. The distance between the seating portions 17a is greater at a position closer to the top of the stopper protrusions 17. Meanwhile, the thickness of the body panel 16 becomes smaller as the distance between the seating portions 17a becomes greater.

In view of the above, if thickness T of the body panel 16 is great (indicated by $t_1$ in FIG. 2A), width L of the body panel 16 is made smaller so as to attach the fixing device 11 to the body panel 16. In other words, the width $1_1$ of the body panel 16A should be designed such that the edges of the body panel 16A are seated close to the base bottoms of the seating portions 17a. Thus, the fixing device 11 will never wobble.

If thickness T of the body panel 16 is small (indicated by $t_2$ in FIG. 2B), width $1_2$ of the body panel 16B is designed such that the edges of the body panel 16B are seated close to the upper edges of the seating portions 17a. By doing so, the fixing device 11 will never wobble.

The stopper holes 16a of the body panel 16A are the same as those of the body panel 16B, and the relationship between the thickness T and the width L can be expressed as: $t_1 > t_2$, $1_1 < 1_2$.

Figure 3:
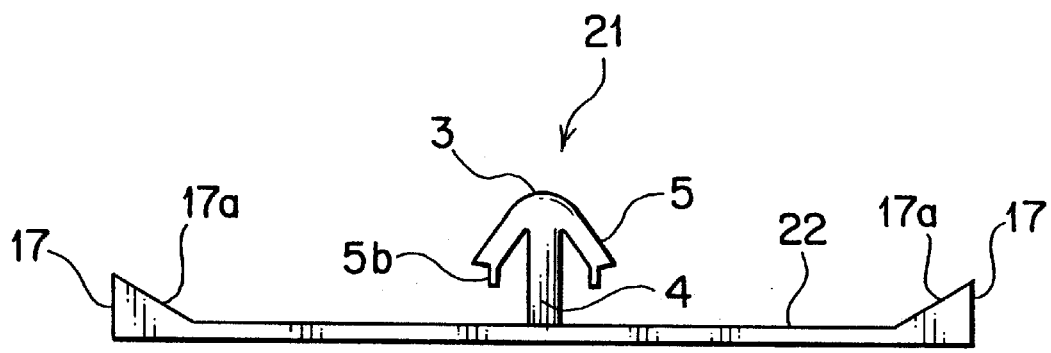
FIG. 3 is a side view showing another embodiment of a wire harness fixing device in accordance with the present invention.

FIG. 3 shows another embodiment of the present invention. Unlike the fixing device 11 shown in FIG. 1, a fixing device 21 has only one clip 3 standing from a thin attachment plate 22, while a pair of stopper protrusions 17 are the same as in FIG. 1. The edges of the body panel (not shown) are interposed between the seating portions 17a, so that the fixing device 21 will never wobble or rotate around the clip 3. It is possible to vary the number of clips 3 standing between the stopper protrusions 17, and the thickness of the attachment plate 2 where necessary.

Figure 4:
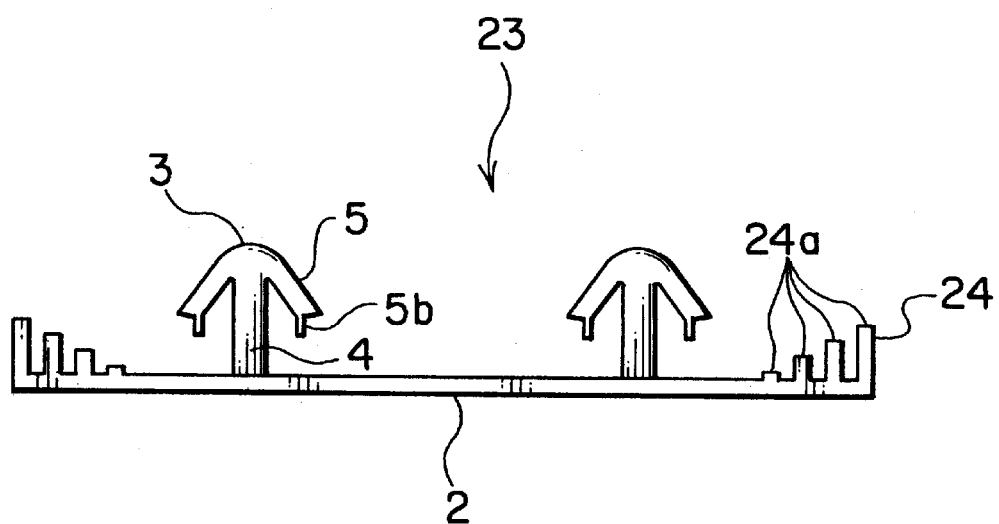
FIG. 4 is a side view showing yet another embodiment of a wire harness fixing device in accordance with the present invention.
Figure 5:
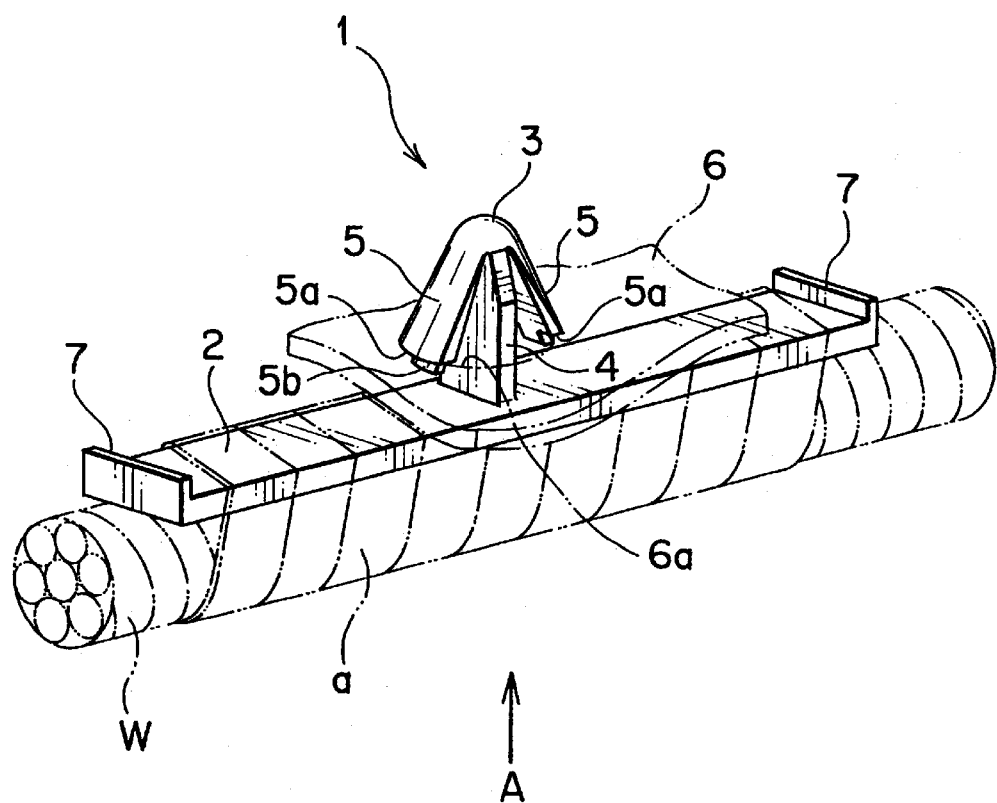
FIG. 5 is a perspective view of the prior art.
Figure 6A:
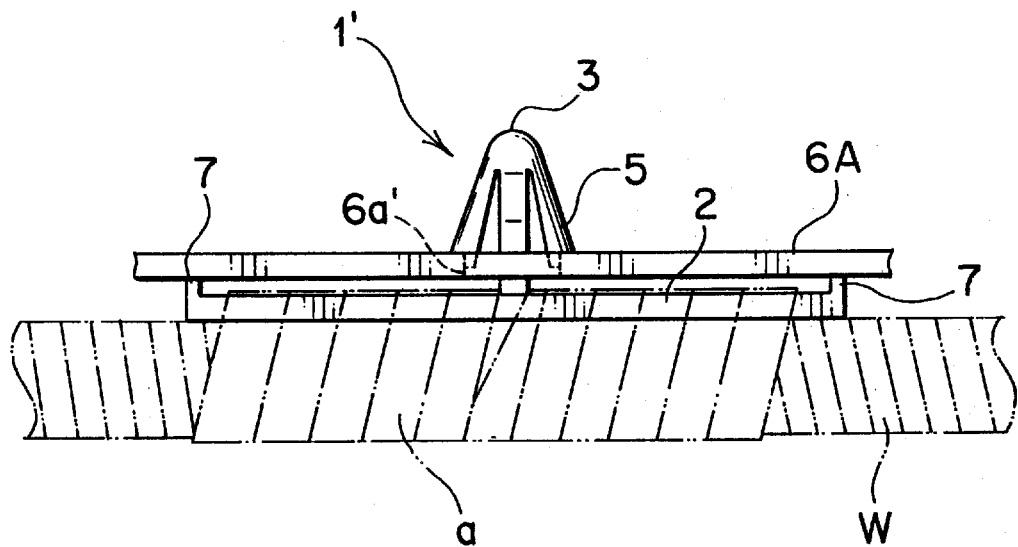
FIG. 6A is a side view illustrating how the wire harness fixing device shown in FIG. 5 is attached to a thick body panel.
Figure 6B:
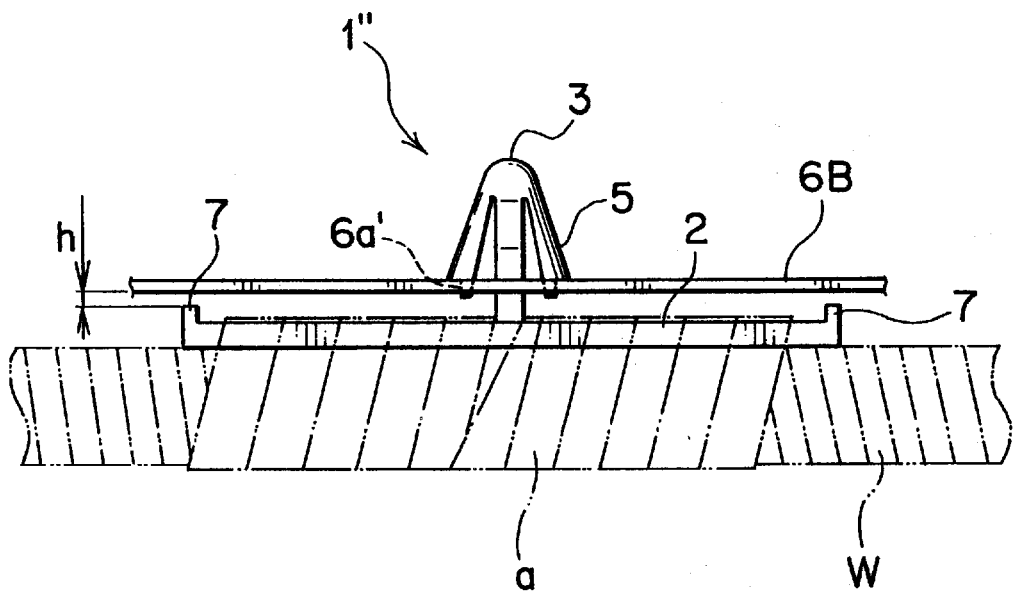
FIG. 6B is a side view illustrating how the wire harness fixing device shown in FIG. 5 is attached to a thin body panel.

FIG. 4 shows still another embodiment of the present invention. A pair of stopper protrusions provided on a fixing device 23 are made up of a plurality of protrusions of different heights, so that seating portions 24a are tapered. In this embodiment, the thickness T and the width L of the body panel (not shown) can also be adjusted where necessary, as in the previous embodiment. The seating portions can be formed in accordance with the type of the body panel, to which the fixing device can be attached. Accordingly, the fixing device 23 attached to the body panel will never wobble. Although two clips 3 are shown in FIG. 4, it is possible to provide the attachment plate 2 with only one clip 3. In such case, the fixing device 23 is secured around the clip 3 by protrusions situated outside the protrusions on the seating portions 24, so that it will never rotate.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A wire harness fixing device for fixing a wiring harness to a body panel having a device-securing hole comprising:

an attachment plate for securing a wire harness by wrapping tape therearound;

a clip provided on said attachment plate for insertion into said hole formed through said body panel, said clip having a pillar upstanding from a base portion of said attachment plate and supporting a pair of stopper wings extending in opposite directions from said pillar and containing projections depending from free ends thereof for engaging edges of said body panel hole;

a pair of protrusions upstanding from a base portion of said attachment plate and mutually spaced in oppositely facing relation with respect to each other and between which said clip is interposed; and said protrusions containing seating portions for engaging a body panel at opposite ends thereof, said seating portions having surfaces for providing lateral and vertical support for said body panel ends, said surfaces of said protrusions being oppositely graduated and tallest at positions farthest from said clips, and wherein said surfaces of said seating portions are each disposed in opposed facing relation to the direction of extensions of an adjacent stopper wing and extend to a height no lower than said projections on said stopper wings.

2. The wire harness fixing device according to claim 1, wherein said attachment plate has a plurality of clips protruding from the base portion thereof.

3. The wire harness fixing device for fixing a wiring harness to a body panel having a device-securing hole comprising:

an attachment plate for securing a wire harness by wrapping tape therearound;

a clip provided on said attachment plate for insertion into said hole formed through said body panel, said clip having a pillar upstanding from a base portion of said attachment plate and supporting a pair of stopper wings extending in opposite directions from said pillar and containing projections depending from free ends therof for engaging edges of said body panel hole;

a pair of protrusions upstanding from a base portion of said attachment plate and mutually spaced in oppositely facing relation with respect to each other and between which said clip is interposed; and said protrusions containing seating portions for engaging a body panel at opposite ends thereof, said seating portions having surfaces for providing lateral and vertical support for said body panel ends, said surfaces of said protrusions being oppositely graduated and tallest at positions farthest from said clips, wherein said surfaces of said seating portions are each disposed in opposed facing relation to the direction of extension of an adjacent stopper wing and extend to a height no lower than said projections on said stopper wings, and wherein said seating portions are formed by a plurality of protrusions upstanding from said attachment plate base portion, said protrusions being of progressively increasing heights which are tallest at positions farthest from said clip(s).

4. The wire harness fixing device according to claim 3, wherein said protrusions are provided at both ends of said attachment plate.

5. The wire harness fixing device for fixing a wiring harness to a body panel having a device-securing hole comprising:

an attachment plate for securing a wire harness by wrapping tape therearound;

a clip provided on said attachment plate for insertion into said hole formed through said body panel, said clip having a pillar upstanding from a base portion of said attachment plate and supporting a pair of stopper wings extending in opposite directions from said pillar and containing projections depending from free ends thereof for engaging edges of said body panel hole;

a pair of protrusions upstanding from a base portion of said attachment plate and mutually spaced in oppositely facing relation with respect to each other and between which said clip is interposed; and said protusions containing seating portions for engaging a body panel at opposite ends thereof, said seating portions having surfaces for providing lateral and vertical support for said body panel ends, said surfaces of said protrusions being oppositely graduated and tallest at positions farthest from said clips, wherein said surfaces of said seating portions are each disposed in opposed facing relation to the direction of extension of an adjacent stopper wing and extend to a height no lower than said projections on said stopper wings, and wherein said portions are formed by a plurality of protrusions of progressively increasing heights which are tallest at positions farthest from said clip(s).

6. The wire harness fixing device according to claim 5, wherein said protrusions are provided at both ends of said attachment plate.

7. The wire harness fixing device according to claim 2, wherein said protrusions are provided at both ends of said attachment plate.

* * * * *